(12) United States Patent
More (10) Patent No.: US 9,362,799 B2
(45) Date of Patent: Jun. 7, 2016

(54) ACOUSTIC COVERING FOR A GENERATOR SET ENCLOSURE WITH PRESSURE SENSITIVE ADHESIVE

(71) Applicant: Cummins Power Generation IP, Inc., Minneapolis, MN (US)

(72) Inventor: Shashikant Ramdas More, Coon Rapids, MN (US)

(73) Assignee: CUMMINS POWER GENERATION IP, INC., Minneapolis, MN (US)

( * ) Notice: Subject to any disclaimer, the term of this patent is extended or adjusted under 35 U.S.C. 154(b) by 4 days.

(21) Appl. No.: 14/252,263

(22) Filed: Apr. 14, 2014

(65) Prior Publication Data

US 2015/0292200 A1   Oct. 15, 2015

(51) Int. Cl.
| | |
|---|---|
| *G10K 11/162* | (2006.01) |
| *G10K 11/168* | (2006.01) |
| *F02B 77/13* | (2006.01) |
| *H02K 5/24* | (2006.01) |
| *F02B 63/04* | (2006.01) |
| *G10K 11/16* | (2006.01) |
| *F02B 77/11* | (2006.01) |

(52) U.S. Cl.
CPC ........ *H02K 5/24* (2013.01); *F02B 63/04* (2013.01); *G10K 11/162* (2013.01)

(58) Field of Classification Search
CPC .... E04B 1/8218; G10K 11/16; G10K 11/162; G10K 11/168; F02B 77/11; F02B 77/13
USPC .......... 181/284, 200, 204, 202, 205, 198, 293
See application file for complete search history.

(56) References Cited

U.S. PATENT DOCUMENTS

| | | | | |
|---|---|---|---|---|
| 2,069,413 | A * | 2/1937 | Leadbetter .......... | B60R 13/0212 181/290 |
| 2,192,516 | A * | 3/1940 | Cunnington ................... | 428/158 |
| 2,294,125 | A * | 8/1942 | Niedermeier .................. | 181/200 |
| 3,176,789 | A * | 4/1965 | Lighter .......................... | 181/290 |
| 3,881,569 | A * | 5/1975 | Evans, Jr. ..................... | 181/200 |
| 3,963,094 | A * | 6/1976 | Nowikas ................ | E04B 1/8218 181/198 |
| 3,967,693 | A * | 7/1976 | Okawa .......................... | 181/284 |
| 4,351,870 | A | 9/1982 | English, Jr. | |
| 4,469,736 | A * | 9/1984 | Machholz ....................... | 428/159 |
| 4,477,505 | A * | 10/1984 | Warnaka ........................ | 428/160 |
| 4,733,750 | A * | 3/1988 | Poirier et al. .................. | 181/202 |
| 5,014,815 | A * | 5/1991 | Arcas et al. .................... | 181/213 |
| 5,076,631 | A * | 12/1991 | Lord, Jr. .................. | B60R 13/02 296/37.8 |
| 5,134,014 | A * | 7/1992 | Zaima et al. ................... | 428/186 |
| 5,151,018 | A * | 9/1992 | Clendenin et al. ............. | 417/312 |

(Continued)

FOREIGN PATENT DOCUMENTS

| | | | | |
|---|---|---|---|---|
| EP | 1024054 A2 * | 8/2000 | ............. | B60R 13/02 |
| GB | 2216081 A * | 10/1989 | ............. | B60R 13/08 |
| GB | 2292786 A * | 3/1996 | ........... | G10K 11/168 |

*Primary Examiner* — Edgardo San Martin
(74) *Attorney, Agent, or Firm* — Foley & Lardner LLP (57) ABSTRACT

A housing for a generator set includes an enclosure within which the generator set is disposed. The housing further includes a covering including a substantially flat top face and a bottom face comprising a plurality of undulations. The bottom face is disposed between the top face and the enclosure. Each of the plurality of undulations has a peak atop which an adhesive bead is positioned. The adhesive bead is responsive to pressure exerted thereon. Each of the undulations is in contact with the enclosure via a respective adhesive bead.

30 Claims, 3 Drawing Sheets

(56) References Cited

U.S. PATENT DOCUMENTS

| | | | |
|---|---|---|---|
| 5,274,200 A * | 12/1993 | Das et al. | 181/202 |
| 5,660,908 A * | 8/1997 | Kelman et al. | 428/74 |
| 5,881,990 A * | 3/1999 | Kawamura | 248/638 |
| 5,892,187 A * | 4/1999 | Patrick | 181/286 |
| 6,769,510 B2 * | 8/2004 | Ueno et al. | 181/204 |
| 6,793,465 B2 * | 9/2004 | Stallings | 417/312 |
| 7,011,181 B2 * | 3/2006 | Albin, Jr. | 181/290 |
| 7,182,172 B2 | 2/2007 | Albin, Jr. | |
| 8,087,494 B2 * | 1/2012 | Palumbo et al. | 181/290 |
| 8,230,969 B2 | 7/2012 | Frederick et al. | |
| 8,443,935 B2 * | 5/2013 | Nishikawa et al. | 181/290 |
| 2004/0129493 A1 * | 7/2004 | Campbell | 181/204 |
| 2005/0263346 A1 * | 12/2005 | Nishimura | 181/290 |

\* cited by examiner

ACOUSTIC COVERING FOR A GENERATOR SET ENCLOSURE WITH PRESSURE SENSITIVE ADHESIVE

TECHNICAL FIELD

The present application relates to acoustic coverings. More particularly, the present application relates to an acoustic covering system having a pressure sensitive adhesive for use in an enclosure of a generator set.

BACKGROUND

Acoustic coverings, such as acoustic panels, are used to modify the acoustic characteristics of the devices or objects to which they are applied. The application of acoustic coverings alters acoustic performance. For example, an acoustic covering can change the sound absorption characteristics of the object that it covers.

Engines generally produce substantial amounts of noise and vibration, even when enclosed in a hard cover or enclosure. In particular, this is an issue for generator sets (also referred to as "gensets") which are often employed in stationary emplacements or in locations that may be sensitive to noise emissions, such as residential areas, hospitals, and office buildings. Providing acoustic coverings for gensets may mitigate the noisiness of the gensets by reducing the amount of sound energy reverberating therefrom. However, attaching materials to a genset housing so as to alter acoustic performance may entail employing mechanical fasteners such as bolts, which increase the costs of materials, labor, and assembly, and which require additional components to be obtained. In particular, fastening such acoustic materials may necessitate multiple fasteners, which can increase the complexity of assembly.

SUMMARY

The subject matter of the present application has been developed in response to the present state of the art, and in particular, in response to the problems and needs in the art that have not yet been fully solved by currently available noise mitigation techniques for gensets. Accordingly, the subject matter of the present application has been developed to provide apparatus, methods, and systems for mitigating noise performance and improving attachment of acoustic coverings so as to overcome at least some shortcomings of the prior art.

In one implementation, a housing for a generator set is provided. The housing comprises an enclosure within which the generator set is disposed, and a covering including a substantially flat top face, and a bottom face comprising a plurality of undulations. The bottom face is disposed between the top face and the enclosure. Each of the plurality of undulations has a peak atop which an adhesive bead is positioned, which adhesive bead is responsive to pressure exerted thereon. Each of the plurality undulations is in contact with the enclosure via a respective adhesive bead.

In another implementation, an acoustic covering assembly comprises a cover having a first face and a second face that is opposed to the first face and which defines a cover surface. The second face is formed of a plurality of substantially symmetrical undulations spaced at regular intervals along the cover surface. Each of the undulations has a peak. The acoustic covering assembly further comprises at least one panel comprising an enclosure of a generator set, an adhesive responsive to pressure exerted thereon and configured to secure the second face to a surface of the at least one panel of the enclosure. The first face is disposed farther from the surface of the at least one panel than the second face, and the adhesive is applied at the peaks of the undulations.

In another implementation, a method of reducing acoustic noise emanating from a generator set is provided. The method comprises providing a covering to surround at least one panel of an enclosure for the generator set. A plurality of undulations is formed on a first side of the covering, and each of the undulations has a peak. The method further comprises applying a bead of adhesive to each peak, the adhesive being responsive to pressure exerted thereon, and disposing the covering such that the adhesive secures the first side of the covering to the at least one panel.

BRIEF DESCRIPTION OF THE FIGURES

In order that the advantages of the subject matter may be more readily understood, a more particular description of the subject matter briefly described above will be rendered by reference to specific implementations that are illustrated in the appended drawings. Understanding that these drawings depict only typical implementations of the subject matter and are not therefore to be considered to be limiting of its scope, the subject matter will be described and explained with additional specificity and detail through the use of the drawings, in which.

DETAILED DESCRIPTION OF THE VARIOUS EMBODIMENTS

Reference throughout this specification to features, advantages, or similar language does not imply that all of the features and advantages that may be realized with the subject matter of the present disclosure should be or are in any single implementation. Rather, language referring to the features and advantages is understood to mean that a specific feature, advantage, or characteristic described in connection with an implementation is included in at least one implementation of the present disclosure. Thus, discussion of the features and advantages, and similar language, throughout this specification may, but do not necessarily, refer to the same implementation.

Referring to the figures generally, various embodiments disclosed herein relate to acoustic coverings for engine and genset enclosures. As noted above, engines, and, in particular, gensets, typically produce substantial amounts of noise. Acoustic material with particular non-formations (for example, mounded shapes such as undulations, as described below) can enhance acoustic noise reduction performance compared to flat-surface acoustic materials. Air cavities formed by the convolutions may be helpful in improving the properties of such acoustic materials. Particular improvement may be realized with respect to properties such as Noise Reduction Coefficient ("NRC") and Sound Transmission Loss ("STL").

In certain embodiments, the formation of convoluted material in an acoustic covering of a genset creates the aforementioned air cavities. Specifically, the air cavities are provided between the convolutions of the convoluted material and an enclosure of the genset. Such configurations leverage the advantages of air cavities in reducing noise. Further, at least some of the disclosed non-limiting embodiments described herein can achieve such noise reduction even though the convoluted material is only contacted with the genset enclosure at the peaks of the convoluted material. That is, gains in acoustic performance can be achieved by arranging acoustic material with convolutions on the genset enclosure such that the apexes of the convolutions touch the enclosure itself.

Moreover, in certain embodiments, the aforementioned configuration can achieve improvements in noise reduction without requiring the acoustic covering to be connected to the genset enclosure via mechanical fasteners such as bolts, nails, push-pins, and/or straps. Additionally, by arranging the acoustic covering such that only the peaks of the convoluted material contact the enclosure can ensure that the volume of the aforementioned air cavities is undiminished. In other words, as opposed to configurations in which a substantial extent of the convoluted material contacts the engine or genset enclosure (for example, where respective surfaces of the acoustic covering and the enclosure are substantially parallel), only a small amount of the convoluted material contacts the enclosure. Thus, the air volume of the air cavities of the convoluted material is not sacrificed. Inasmuch as air is a poor conductor of noise in comparison to solid materials, the acoustic cavities can enhance the sound insulation performance of such embodiments.

Figure 1:
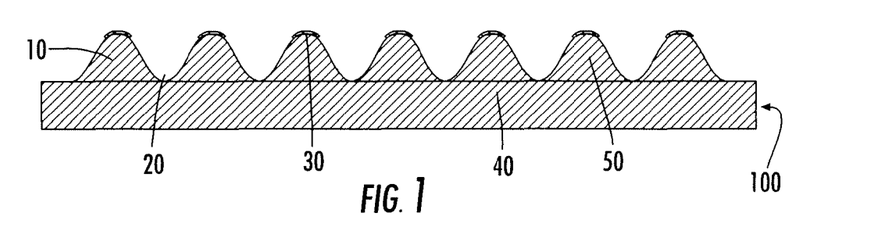
FIG. 1 is an acoustic covering, according to an embodiment.

Referring to FIG. 1, a covering 100 includes a substantially rectilinear portion 40 and a convoluted portion 50. In some embodiments, portions 40 and 50 may be integrated and formed as a single piece. In other embodiments, portions 40 and 50 are discrete components joined together or otherwise positioned so as to contact each other. Whereas portion 40 is substantially flat, portion 50 is defined by undulations. In some embodiments, the undulations may be regularly spaced along equal intervals, and may be uniform in size. In other embodiments, the undulations—which lend the portion 50 its convoluted form—may be spaced at irregular intervals and may have differing sizes. The undulations of the convoluted portion 50 are defined by peaks 10 and valleys or troughs 20. For example, the convolution portion may have a sinusoidal waveform, whereby the difference in height between the peaks 10 and the valleys 20 correspond to an amplitude of the respective waveform.

According to various embodiments, such as the embodiment shown in FIG. 1, pressure-sensitive adhesive 30 is applied only to the peaks 10 of the convoluted portion 50 and is applied in a controlled manner. The adhesive 30 is applied so as to form beads of adhesive on the peaks 10 of the convoluted portion 50. The diameter of the beads in some embodiments varies from 3 to 4 mm. Application of the pressure sensitive adhesive 30 in a controlled, repeatable manner ensures that uniform and regular amounts of the adhesive 30 are provided on the peaks 10. In some embodiments, a bead size of 3-4 mm corresponds to the bead size after the adhesive has been applied and is measured as being on the convolution peak itself. In other embodiments, the bead size is not between 3-4 mm, and may be any appropriate bead size such that a sufficient amount of adhesive remains on the convolution peaks without an excess amount of adhesive spreading to other locations. That is, the adhesive is applied as beads having a diameter sufficient so as to remain on the peaks without being applied in valleys between the peaks. In other words, in such embodiments, no adhesive is applied in the valleys of each undulation, and the bead size is tailored accordingly. Furthermore, in still other embodiments, the amount of adhesive in each bead may vary from 3-4 mm within a specified tolerance, for example, plus or minus 0.4 mm.

In some embodiments, the application of the pressure sensitive adhesive 30 to the peaks 10 of the undulating hills of the convoluted material 50 allows for protection of the valleys 20 of the convolutions. More particularly, the valleys 20 of the convoluted portion 50 are protected such that the application of the pressure sensitive adhesive 30 does not affect acoustic performance in terms of sound transmission loss ("STL") and/or sound adsorption coefficients due to modification of the volume of the acoustic cavities. The modification of the volume corresponds to changes in cavity size. In some embodiments, the cavity volume corresponds to the volume of an inverted pyramid that may be fitted into each cavity formed by a plurality of convolutions (e.g., four convolutions) disposed adjacent to each other.

Referring again to FIG. 1, the acoustic covering 100 having the substantially rectilinear portion 40 and the convoluted portion 50 is defined by two faces. More specifically, a surface of the substantially flat portion 40 defines a first face, while a surface of the convolution portion 50 defines a second face. As appreciated from FIG. 1, the first face of the substantially flat portion 40 is opposed to the second face of the convolution portion 50. The second face of the convolution portion 50 receives the pressure sensitive adhesive 30 applied to the peaks 10 of the convolution portion 50.

As noted above, the pressure sensitive adhesive 30 is responsive to pressure exerted thereon. By being applied to the peaks 10 of the convolution portion 50, the pressure sensitive adhesive 30 is configured such that, when pressure is exerted on the adhesive 30, the adhesive 30 secures the second face of the convolution portion 50 to an enclosure surface (not shown). In this manner, the adhesive 30 ensures that the convolution portion 50 is fastened to the enclosure surface and that it remains in place. Notably, by virtue of adhering the convolution portion 50 to the enclosure surface, the pressure sensitive adhesive 30 may obviate the need for metal fasteners or other mechanical fastening systems, such as buckles, bolts, clips and snaps, for example. Thus, the adhesive 30 may be applied such that the second face is configured to attach to the enclosure surface without bolts or fasteners.

Referring again to FIG. 1, the pressure sensitive adhesive 30 has an adhesive bond strength suitable for securing the convoluted portion 50 to the enclosure. The selection of a particular adhesive 30 may be made in consideration of the viscosity and other rheological characteristics of the adhesive 30. The flow properties of the adhesive 30 are such that when the adhesive 30 is applied in a controlled amount, so as to produce the beads of adhesive shown in FIG. 1, the beads are fixed to the peaks 10 and do not flow into the valleys 20 of the convoluted material 40. Furthermore, the convoluted portion 50 with the adhesive 30 applied thereto should be sufficiently non-flammable.

Further, in some embodiments, the convolution portion 50 having the peaks 10 to which the adhesive 30 is applied is arranged such that the peaks 10 are in communication with the enclosure surface of the enclosure of a generator set. In contrast, the first face provided on the substantially flat portion 40 is disposed farther from the enclosure surface than the second face. In some embodiments, the first face defines another surface opposed to the surface of the second face.

Referring once more to FIG. 1, the covering 100 may be made out of melamine foam. However, it should be understood that any suitable material may be used. Similarly, although specific quantities of materials and material properties may be mentioned in the context of particular embodiments, it should be understood that these quantities and/or properties are indicative of particular examples and that other quantities and/or properties may be specified. Likewise, although the embodiments herein may make reference to particular dimensions, the discussion of specific geometries and dimensions is not intended to be limiting. In particular, different types of acoustic materials may be used. In some embodiments, the covering 100 may comprise more than one type of acoustic material. It is noted that, in one embodiment, the covering 100 is a one or more layers of foam material or other bulk acoustic deadening material, for example, melamine foam, polyurethane foam, glass wool, closed cell foam, open cell foam, mineral wool, rock wool, polyester fibrous materials, rubber, wood fiber, or textile fiber, that is covered on the substantially flat portion by a fabric or other flexible sheet material to alter one or more of the acoustic properties of the covering 100, improve structural integrity of the covering 100, reduce air flow resistance against the covering 100 in the enclosure, or reduce dirt or oil fouling of the covering 100.

In the embodiment shown in FIG. 1, the first face of the substantially flat portion 40 is a face that is the farthest away from the peaks 10 of the convolution portion 50. The second face of the convolution portion 50 and the first face of the substantially flat portion 40 define a body portion of the covering 100. In some embodiments, the first face and the second face define a body portion having a surface density of 0.33 kg/m$^2$, and a thickness of the body portion is 25 mm. In some embodiments, the first face and the second face define a body portion having a surface density of 0.57 kg/m$^2$, while the thickness of the body portion is 50 mm. In some embodiments, the thickness of the body portion may exceed 50 mm. In some embodiments, the thickness of the body portion is 40 mm. Additionally, in some embodiments, the surface density may vary between 0.2-0.6 kg/m$^2$ while the thickness may vary between 25-50 mm. In certain embodiments, at least one of the surface density and thickness may be outside the respective ranges of 0.2-0.6 kg/m$^2$ and 25-50 mm. In some embodiments, the surface density may be equal to or exceed 10.7 kg/m$^2$ (for example, up to 11 kg/m$^2$). The thickness of the body portion is measured from the first face (i.e., the flat face of the flat portion) to the peaks 10 of the convolution portion 50, as shown in FIG. 1. In some embodiments, the thickness may vary from 12.5-50 mm. Both the surface density and thickness may be predetermined in certain embodiments.

In some embodiments, the noise reduction achieved using the covering 100 may be 4-6 dBA in comparison to conventional systems. In some embodiments, the noise reduction may be realized over a wider range, e.g., 1-7 dBA. The noise reduction in comparison to materials on a flat surface may vary depending on certain factors. The performance difference may be even greater depending on the choice of materials used on a flat surface. Thus, even greater noise reductions may be realized by the aforementioned embodiments in comparison to some conventional systems.

Although the embodiment of FIG. 1 depicts the convoluted material 50 as possessing a plurality of undulations, it is also possible for the convoluted material 50 to not have such undulations. Instead, the convoluted material 50 may be provided with convolutions that may be shaped as triangles, pyramids, or wedges. In some embodiments, any combination of undulations, triangles, pyramids, or wedges may define the surface of the convoluted material 50.

The embodiments discussed herein advantageously allow for the generator set covered by the covering 100 to be quieter and to have improved sound quality. The benefits of reduced noise include enhanced working environmental and operating conditions and reduced vibration, among others. Furthermore, the pressure sensitive adhesive 30 allows for the convoluted portion 50 to be secured to the enclosure of the generator set without bolts, push-pins or other fastening devices. Such embodiments can therefore advantageously realize significant cost savings and a reduction in the complexity of their component needs and assembly requirements. For example, eliminating a plurality of metal fastening devices allows for simplification of inventory planning and procurement. Assembly time and ease may be improved by removing the requirements for both bolting and strapping on such fasteners. Further, certain embodiments may be particularly advantageous in terms of Sound Transmission Loss ("STL") in a frequency range of 400 to 4000 Hz.

Figure 2:
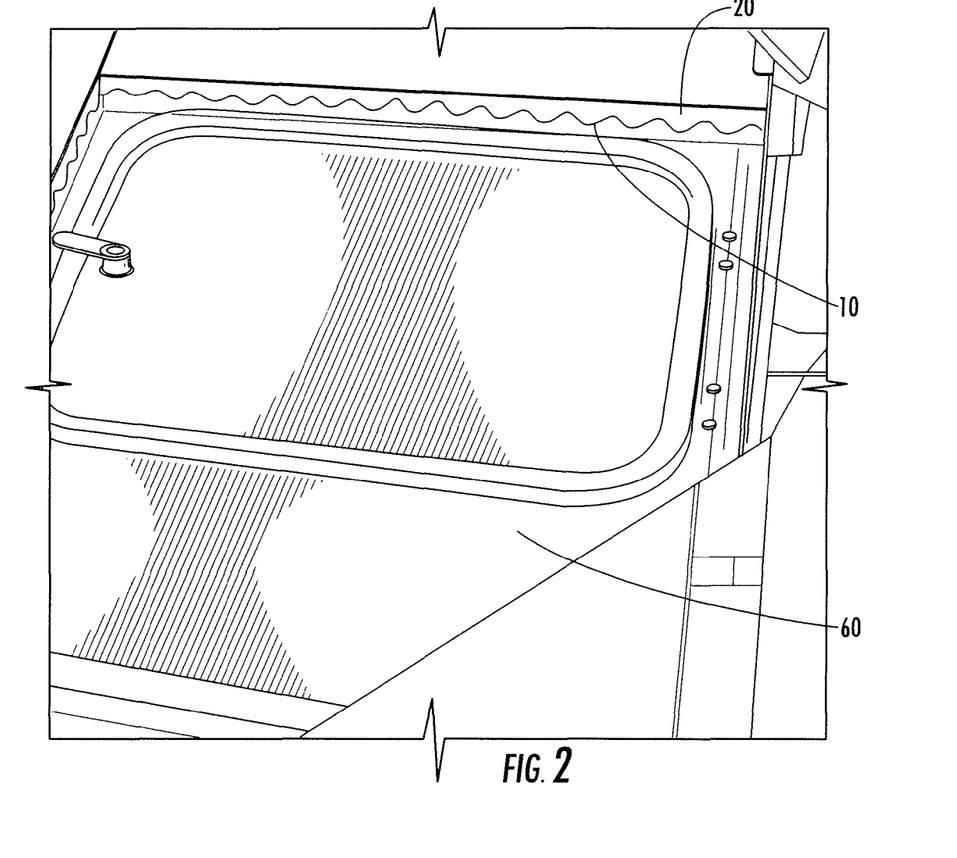
FIG. 2 is an acoustic covering disposed on a genset enclosure, according to an embodiment.

FIG. 2 depicts an acoustic covering disposed on a genset enclosure according to an embodiment. The acoustic covering 100 is arranged such that the peaks 10 of the convoluted portion 50 are in contact with an enclosure 60 of a genset. As shown in FIG. 2, the acoustic covering 100 is provided with the convoluted portion 50 only on one side of the covering 100. FIG. 2 indicates that the peaks 10 contact the enclosure 60 such that air cavities may be formed, as described above. Although not shown, the adhesive 30 may be applied to the peaks 10 of the convoluted portion 50 so as to fasten the genset enclosure 60 and the convoluted portion 50 together. In some embodiments, the acoustic covering 100 and the enclosure 60 form a housing for a genset.

Figure 3:
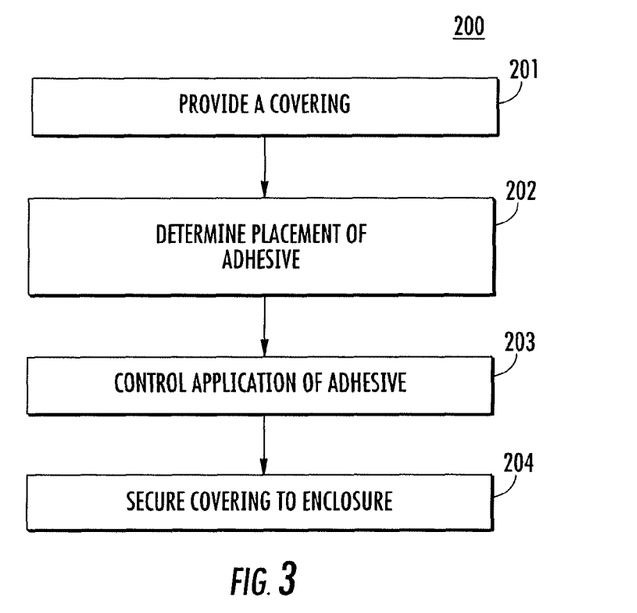
FIG. 3 is a flow diagram of an exemplary method of reducing noise emanating from a genset.

FIG. 3 depicts a flow diagram relating to a method 200 for reducing acoustic noise emanating from a generator set. The method includes providing a covering, such as covering 100, to surround at least one panel of an enclosure (for example, the enclosure 60 shown in FIG. 2) for the generator set (201). A plurality of undulations is formed on a first side of the covering 100, and each of the undulations has a peak. The method further includes determining placement of a pressure sensitive adhesive, such as adhesive 30, on the first side of the covering (202), and applying a bead of adhesive to each peak (203). As mentioned above in the context of FIG. 1, the adhesive is applied in a controlled, regulated manner such that a degree of consistency and uniformity can be obtained. For example, if the desired size of each bead of adhesive 30 is between 3-4 mm, method 200 entails controlling the application of the adhesive 30 by regulating the flow characteristics (e.g., amount, pressure of ejection, viscosity) of the adhesive 30 as well as its placement on the undulations. The method further includes disposing the covering such that the adhesive secures the first side of the covering to the at least one panel (204).

Figure 4A:
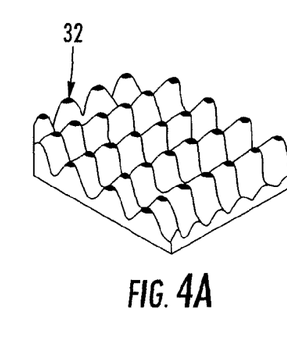
FIGS. 4(a), 4(b) and 4(c) depict various configurations showing pressure sensitive adhesive having been applied to portions of an acoustic covering.
Figure 4B:
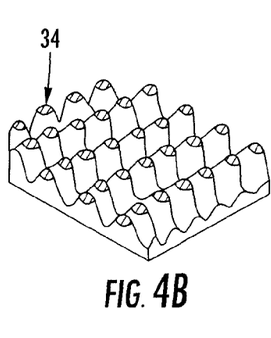
Figure 4C:
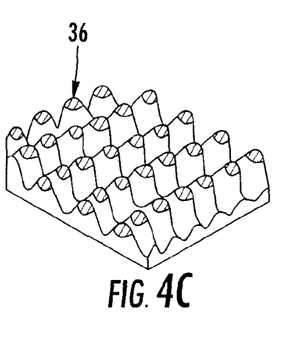

As indicated above, controlling the placement and size of the adhesive 30 ensures uniformity among the adhesive beads on the undulations of the convoluted portion 50. FIG. 4 depicts various configurations of pressure sensitive adhesive. In particular, FIGS. 4(*a*)-(*c*) respectively indicate small, medium, and large sizes of adhesive beads as disposed on the peaks 10 of the convoluted portion 50. Controlling the size of the beads of adhesive 30 may be particularly important in order to maintain the contact between the peaks of the convolutions to the wall or surface of the genset enclosure 60. Although providing a larger amount of adhesive may ensure a secure fastening of the convoluted portion 50 to the genset enclosure 60, it entails using more materials and may result in extra amounts of adhesive being inadvertently applied to locations other than the peaks 10. Moreover, a larger bead size may cause more surface area of the convolutions to touch the surfaces and/or walls of the enclosure 60, thus causing a loss of acoustic cavity volume. Large bead sizes may also cause the valleys 20 of the convoluted portion 50 to contact the enclosure 60. In such circumstances, the convoluted portion 50 would behave in the manner of a flat acoustic surface because the adhesive would effectively increase the amount of the surface area of the convoluted portion 50 in contact with the enclosure surface 60. However, providing a medium size, such as 3-4 mm diameter beads, can ensure that a sufficient amount of adhesive 30 is present without using more adhesive than needed.

Figure 5A:
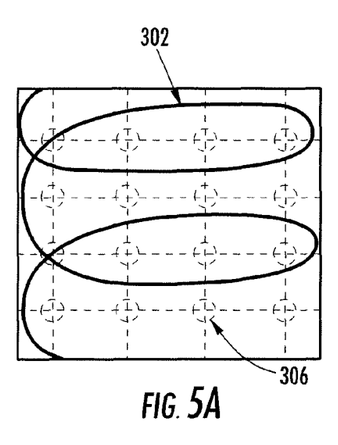
FIGS. 5(a) and 5(b) depict patterns in which pressure sensitive adhesive may be applied.
Figure 5B:
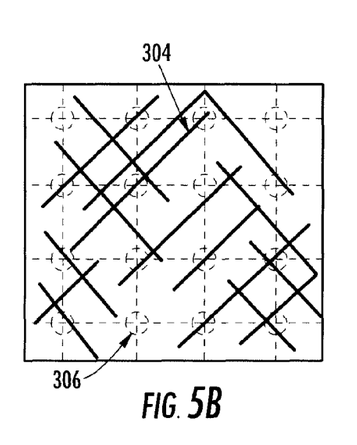

FIGS. 5(a)-5(b) depict various patterns in which the pressure sensitive adhesive 30 may be applied to the peaks 10. In particular, the adhesive 30 can be applied on the peaks 10 of the acoustic covering 100 in random pattern, for example spiral and/or in random lines. FIGS. 5(a) and (b) depict a top views of the applied adhesive 30 on convoluted portion 50 of the covering 100 in spiral and random lines pattern, respectively. In some circumstances, the application of the adhesive 30 in random pattern may cause the application of adhesive 30 in the valleys 10 of the convoluted portion 50. In some circumstances, application of the random patterned adhesive 30 on the convoluted portion 50 so as to attach the convoluted portion 50 to the enclosure 60 may cause the valleys 10 of the convoluted portion 50 to touch or stick to the panels of the enclosure 60. As with overly large amounts of adhesive 30 being applied, this may cause a loss of the acoustic cavity volume and may diminish or eliminate any improvements with respect to acoustic noise reduction. Acoustic performance in such circumstances would be akin to acoustic performance of flat surface acoustic material, which is less effective in acoustic noise reduction as compared to convoluted material.

Figure 6A:
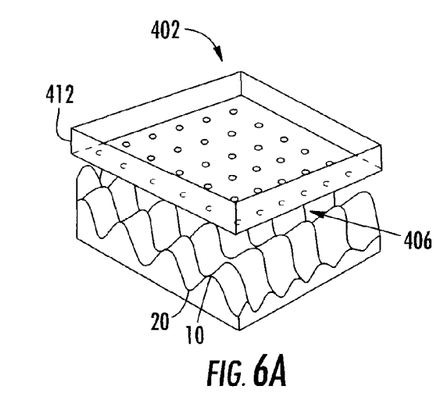
FIGS. 6(a) and 6(b) depict alternative patterns and methods in which pressure sensitive adhesive may be applied.
Figure 6B:
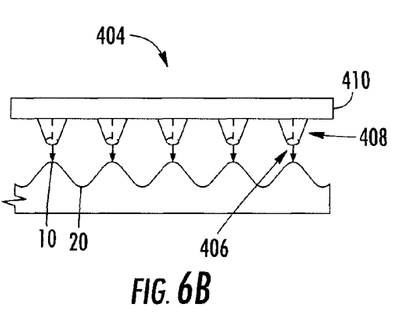

FIGS. 6(a)-6(b) depict alternative patterns in which the pressure sensitive adhesive 30 may be applied, according to an embodiment. A plurality of methods can be used to apply the adhesive 30 on the convoluted peaks 10 such as by using templates of the pattern of convoluted portion 50 with exact mapping coordinates of the peaks 10 where the adhesive 30 is to be applied. The mapping coordinates may indicate the location of each peak in x, y, and z coordinates, for example. In some embodiments, the adhesive 30 is applied by a rolling method using a template with a plurality of orifices. The adhesive is ejected from a container through the orifices of the template, as shown in FIG. 6(a). By using such a template, the application of the adhesive 30 in the valleys 10 of the convoluted portion 50 may be avoided.

Alternatively, as shown in FIG. 6(b), the application of the adhesive can be carried out using cones or nozzles of an adhesive applicator in a roving manner, where a fixed amount of adhesive 30 in a bead form is applied to the peaks 10 of the convoluted portion 50. After application at first set of convolution peaks or tips 10, the cones or nozzles are moved to next location, over a next set of peaks or tips 10 of the convoluted portion 50. The cones or nozzles may be moved to subsequent sets of peaks manually or by a robotic instrument or other mechanized controller. In some embodiments, such an instrument or controller is configured with a processor configured to execute instructions stored in non-transient memory, such as instructions providing the exact coordinates of the peaks 10 and/or specifying an application pattern. In some embodiments, the aforementioned methods may be carried out using computer-readable instructions allowing for customization of an adhesive application profile, including selection of the following parameters: bead size, adhesive selection, bead spacing, application pattern, and a quantity of beads to apply.

It should be noted that any use of the term "exemplary" herein to describe various embodiments is intended to indicate that such embodiments are possible examples, representations, and/or illustrations of possible embodiments (and such term is not intended to connote that such embodiments are necessarily extraordinary or superlative examples).

The term "connected," and similar terms used herein refer to the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The described features, structures, advantages, and/or characteristics of the subject matter of the present disclosure may be combined in any suitable manner in one or more implementations. In the following description, numerous specific details are provided to impart a thorough understanding of implementations of the subject matter of the present disclosure. One skilled in the relevant art will recognize that the subject matter of the present disclosure may be practiced without one or more of the specific features, details, components, materials, and/or methods of a particular implementation. In other instances, additional features and advantages may be recognized in certain implementations that may not be present in all implementations. Further, in some instances, well-known structures, materials, or operations are not shown or described in detail to avoid obscuring aspects of the subject matter of the present disclosure. The features and advantages of the subject matter of the present disclosure are apparent from the foregoing description and appended claims, or may be learned by the practice of the subject matter as set forth herein.

What is claimed is:

1. A housing for a generator set, the housing comprising:
   an enclosure within which the generator set is disposed, the enclosure having an upper surface and a lower surface; and
   a covering including:
      a substantially flat top face, and
      a bottom face comprising a plurality of undulations, the bottom face being disposed between the top face and the enclosure,
   wherein each of the plurality of undulations has a peak atop which an adhesive bead is positioned, which adhesive bead is responsive to pressure exerted thereon,
   wherein each of the plurality of undulations is in contact with the enclosure via a respective adhesive bead, the peaks of the undulations contacting the lower surface of a top portion of the enclosure via the adhesive beads, the undulations structured to abate noise emanating below the lower surface of the enclosure, and
   wherein the peaks are curved and pressure on the adhesive beads causes the adhesive beads to adhere the curved peaks to the enclosure.

2. The housing of claim 1, wherein each of the adhesive beads has a diameter between 3 and 4 mm.

3. The housing of claim 1, wherein the acoustic covering comprises one or more layers of at least one of melamine foam, polyurethane foam, open cell foam, closed cell foam, glass wool, mineral wool, rock wool, polyester fibrous materials, rubber materials, wood fiber, and textile fiber.

4. The housing of claim 1, wherein a surface density of the covering is in the range of 0.2 to 11 kg/m².

5. The housing of claim 1, wherein a thickness of the covering is in the range of 12.5-50 mm.

6. The housing of claim 1, wherein each of the respective adhesive beads has a diameter sufficient so as to remain on the peaks without being applied in valleys between the peaks.

7. The housing of claim 1, wherein the covering comprises a layer of sheet material covering the substantially flat top face and a layer of bulk acoustic material.

8. The housing of claim 1, wherein the covering comprises a plurality of acoustic materials.

9. An acoustic covering assembly, comprising:
   a cover comprising
      a first face; and
      a second face that is opposed to the first face and defining a cover surface,
   the second face formed of a plurality of symmetrical undulations spaced at regular intervals along the cover surface, each of the undulations having a peak;
   at least one panel comprising an enclosure of an engine, the enclosure having an upper surface and a lower surface; and
   adhesive beads responsive to pressure exerted thereon and configured to secure the second face to a surface of the at least one panel,
   wherein the first face is disposed farther from the surface of the at least one panel than the second face,
   wherein the adhesive beads are applied at the peaks of the plurality of undulations, the peaks of the undulations contacting the lower surface of a top portion of the enclosure via the adhesive beads, the undulations structured to abate noise emanating below the lower surface of the enclosure,
   wherein the peaks are curved and pressure on the adhesive beads causes the adhesive beads to adhere the curved peaks to the enclosure, and
   wherein the cover comprises a layer of sheet material covering the first face and a layer of bulk acoustic material.

10. The acoustic covering assembly of claim 9, wherein the adhesive is applied as beads having a diameter between 3-4 mm.

11. The acoustic covering assembly of claim 9, wherein the adhesive is applied as beads having a diameter sufficient so as to remain on the peaks without being applied in valleys between the peaks.

12. The acoustic covering assembly of claim 9, wherein the cover is formed of a plurality of acoustic materials.

13. The acoustic covering assembly of claim 9, wherein the cover comprises one or more layers of at least one of melamine foam, polyurethane foam, open cell foam, closed cell foam, glass wool, mineral wool, rock wool, polyester fibrous materials, rubber materials, wood fiber, and textile fiber.

14. The acoustic covering assembly of claim 9, wherein the adhesive is arranged such that the second face is configured to attach to the surface of the at least one panel without bolts or fasteners.

15. The acoustic covering assembly of claim 9, wherein the engine enclosure is a generator set enclosure.

16. The acoustic covering assembly of claim 9, wherein the first face and the second face define a body portion having a surface density of 0.2 to 11 kg/m².

17. The acoustic covering assembly of claim 9, wherein a thickness of the body portion is 12.5-50 mm.

18. A method of reducing acoustic noise emanating from a generator set, the method comprising:
   providing a covering to surround at least one panel of an enclosure for the generator set, a plurality of undulations formed on a first side of the covering, each of the undulations having a peak, wherein the enclosure has an upper surface and a lower surface,
   applying a bead of adhesive to each peak, the adhesive being responsive to pressure exerted thereon, and
   disposing the covering such that the adhesive secures the first side of the covering to the at least one panel,
   wherein the peaks of the undulations contact the lower surface of a top portion of the enclosure via the adhesive beads, the undulations structured to abate noise emanating below the lower surface of the enclosure, and
   wherein the peaks are curved and pressure on the adhesive beads causes the adhesive beads to adhere the curved peaks to the enclosure.

19. The method of claim 18, wherein applying the bead of adhesive comprises:
   directing the adhesive from cones or nozzles onto a first set of the plurality of undulations, and
   subsequent to directing the adhesive onto the first set of the plurality of undulations, directing the adhesive onto a second set of the plurality of undulations in an ordered manner.

20. The method of claim 18, wherein applying the bead of adhesive comprises inserting the adhesive through orifices in a template.

21. The method of claim 18, wherein applying the bead of adhesive comprises applying the adhesive in a random manner.

22. The method of claim 18, further comprising controlling a size of the adhesive to be applied to each peak so as to be within a predetermined range of diameters.

23. The method of claim 18, wherein the range of diameters is 3-4 mm.

24. The method of claim 18, wherein the second side of the covering is substantially flat and is opposed to the first side.

25. The method of claim 18, wherein the beads have a diameter sufficient so as to remain on the peaks without the adhesive being applied in valleys between the peaks.

26. The method of claim 18, wherein a surface density of the covering is 0.2 to 11 kg/m$^2$.

27. The method of claim 18, wherein a thickness of the covering is 12.5-50 mm.

28. The housing of claim 1, wherein the adhesive beads are fixed to the curved peaks.

29. The method of claim 18, wherein applying the bead of adhesive comprises ejecting the adhesive from a container and directing the adhesive through orifices of a template.

30. The method of claim 18, wherein applying the bead of adhesive comprises rolling the adhesive.

\* \* \* \* \*